Aug. 25, 1964 L. G. ULIN 3,146,313

AMPLIFIER ARRANGEMENT FOR LOUDSPEAKING TELEPHONES

Filed May 31, 1962

INVENTOR
LARS GUNNAR ULIN
BY Hane and Nydick
ATTORNEYS

United States Patent Office 3,146,313
Patented Aug. 25, 1964

3,146,313
AMPLIFIER ARRANGEMENT FOR LOUD-SPEAKING TELEPHONES

Lars Gunnar Ulin, Stockholm, Sweden, assignor to Telefonaktiebolaget L M Ericsson, Stockholm, Sweden, a corporation of Sweden Filed May 31, 1962, Ser. No. 199,016
Claims priority, application Sweden June 8, 1961
3 Claims. (Cl. 179—81)

The present invention relates to an amplifier arrangement for loudspeaking telephones of the kind, which comprises a first amplifier for amplification of outgoing speech currents coming from a microphone and intended for a two-wire line, and a second amplifier for amplification of speech currents intended for a loudspeaker and coming from the two-wire line, a current controlled first attenuation circuit which actuates the amplification of said outgoing speech currents and which is attenuating during the rest condition of the first amplifier, that is when the amplifier is connected but is not supplied with speech currents on the input side, and a current controlled second attenuation circuit which actuates the amplification of said incoming speech currents and which is attenuating during the rest condition of the second amplifier.

The purpose of the invention is to provide an amplifier arrangement of the kind mentioned above, which compared with similar arrangements known up to now, provides a most reliable and rapid control of the attenuation circuits.

An amplifier arrangement formed according to the invention is characterized thereby that it comprises a current controlled third attenuation circuit actuating the amplification of said outgoing talking currents and which is weakly attenuating during the rest condition of the first amplifier, and a current controlled fourth attenuation circuit which is parallel connected to the third attenuation circuit and actuating said incoming speech currents and which is weakly attenuating during the rest condition of the second amplifier, at which the first attenuation circuit, the parallel connection of the third and fourth attenuation circuit as well as the second attenuation circuit are connected in series between two bridge points connected to each of its output side of two speech control amplifiers fed from terminals before the first attenuation circuit respectively before the second attenuation circuit, and at which the direction of the control current of the first and third attenuation circuit is the same and opposite to the direction of the control current of the second and fourth attenuation circuit.

Figure 1:
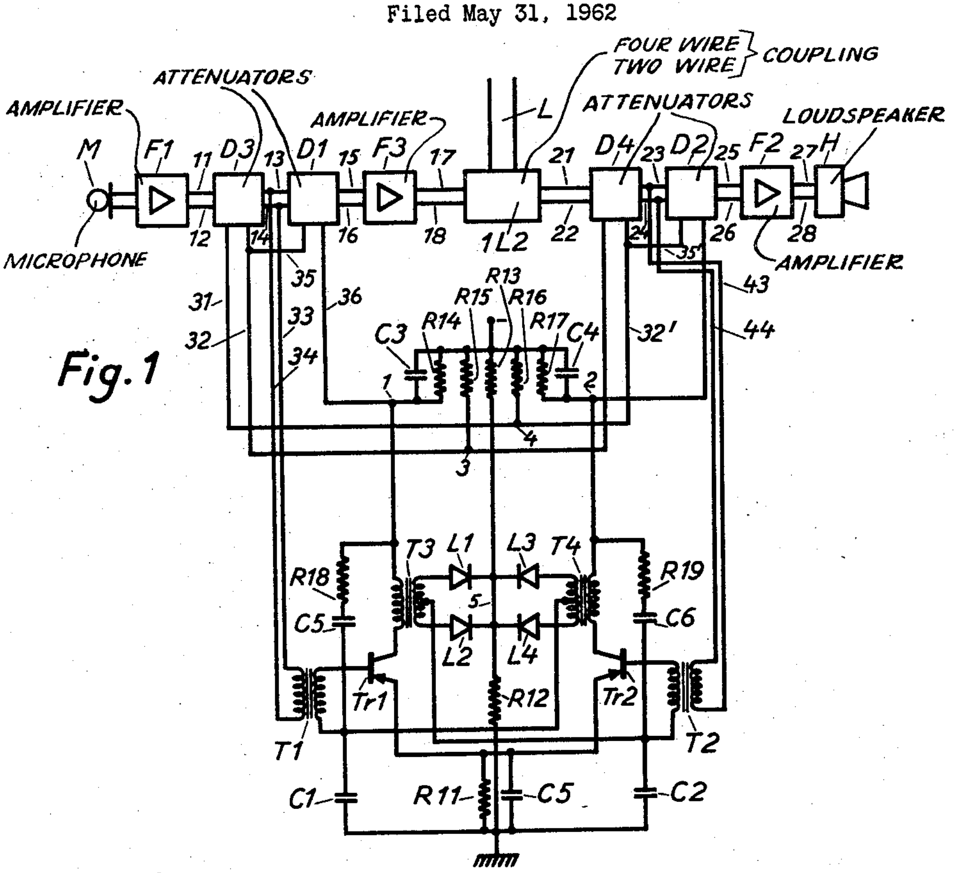
Figure 2:
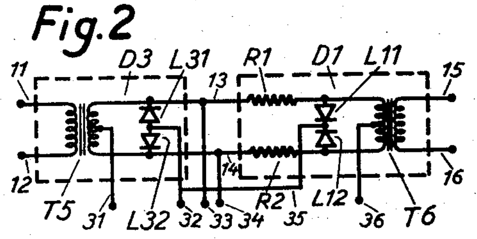
Figure 3:
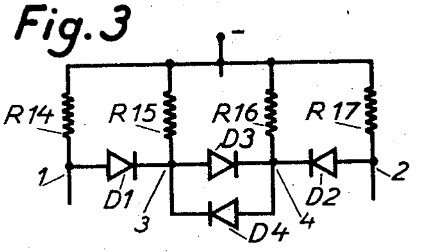
Figure 4:
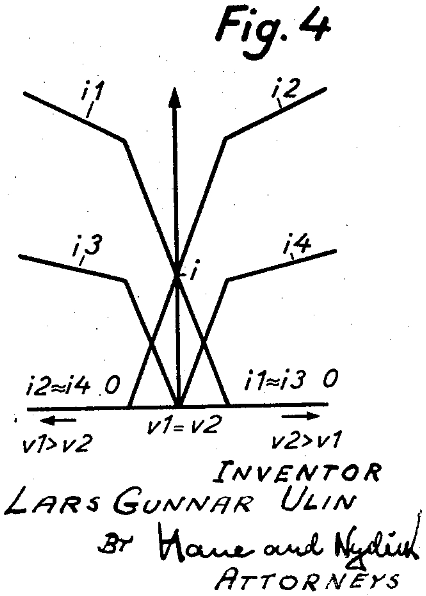

The invention will be further described in connection with the attached drawing where FIG. 1 schematically shows an amplifier arrangement according to the invention, FIG. 2 shows two current controlled attenuation circuits included in the arrangement according to FIG. 1, FIG. 3 shows a separate diagram of all the current controlled attenuation circuits included in the arrangement according to FIG. 1, and FIG. 4 shows graphs of the control currents which are used for said attenuation circuits.

Referring first to FIG. 1, speech currents generated during speech in a microphone M are amplified in a first amplifier F1 and are supplied to a two-wire line L through the line 11–12, an attenuation circuit D3 which is weakly attenuating during the rest condition and the transmitting condition of the amplifier arrangement, this attenuation circuit D3 is referred to as a current controlled third attenuation circuit in the claims, a line 13–14, an attenuation circuit D1 weakly attenuating during the transmitting condition of the amplifier arrangement, which attenuating circuit D1 is referred to as a current controlled first attenuation circuit in the claims, a line 15–16, an amplifier F3, a line 17–18 and a four-wire-two-wire circuit 1L2. The attenuation circuit D3, see FIG. 2, comprises an input transformer T5, the secondary winding of which has a center tap 31, and two rectifiers L31 and L32 which are connected in opposition to each other and join the ends of the secondary winding. The attenuation circuit D1 comprises one outlet transformer T6, the primary winding of which has a center tap 36, and two rectifiers L11 and L12 connected in opposition to each other and joining the ends of the primary winding through resistances R1 and R2 and to the line 13–14.

Speech currents coming from the two-wire line L are fed to a loudspeaker H by the circuit 1L2, a line 21–22, and an attenuation circuit D4, referred to as a current controlled fourth attenuation circuit in the claims, a line 23–24, an attenuation circuit D2, referred to as a current controlled second attenuation circuit in the claims, a line 25–26, a second amplifier F2, and a line 27–28. The attenuation circuit D2 is identical with the attenuation circuit D1 and the attenuation circuit D4 with the attenuation circuit D3. The attenuation circuits D1, D2, D3 and D4 are current controlled, as earlier mentioned, that is their attenuating qualities are influenced by control currents passing them, and they are of such a kind that they are strongly attenuating when they are passed by control current but otherwise weakly attenuating. They are fed from a control current bridge 1–2–3–4, which at one point is connected to a constant negative potential (—) and from this point equally large resistances R14 and R17 are connected to the points 1 and 2 and equally large resistances connected to the points 3 and 4. The resistances R14 and R17 are due to the alternating current short-circuited by the condensers C3 and C4. The point 1 is through the center terminal 36 connected to the output transformer of the attenuation circuit D1, the point 2 is in the same way connected to the output transformer of the attenuating circuit D2, the point 3 is connected through the conductor 32 to the connection point between the rectifiers L31 and L32 of the attenuation circuit D3 and through the conductors 32 and 35 to the connection point between the rectifiers L11 and L12 of the attenuation circuit D1 and the point 4 is connected through the conductor 32′ to the connection point between the rectifiers of the attenuation circuit D4 and through the conductors 32′ and 35′ to the connection point between the rectifiers of the attenuation circuit D2.

Control voltages are fed to the control current bridge at the points 1 and 2 from a speech control bridge T1–Tr1–T3–5–T4–Tr2–T2, which will be described now.

Speech currents generated at speech in the microphone M are partly fed from the line 13–14 through a line 33–34 to an input transformer T1, the secondary winding of which is connected between the base and emitter of a transistor Tr1 through a condenser C1 and a parallel connection of a resistance R11 and a condenser C5. The emitter-collector circuit of the transistor Tr1 is connected between ground and said constant potential (—) of the control current bridge through the parallel connection of the resistance R11 and the condenser C5, the primary winding of an output transformer T3, the point 1 and the parallel-connection of the resistance R14 and the condenser C3. The secondary winding of the output transformer T3 has its two end terminals connected to a common point 5 through unipolar rectifiers L1 and L2. Point 5 is connected through a resistance R13 to said constant potential (—) in the control current bridge and through a resistance R12 to the connection point between the condenser C1 and the parallel connection of the resistance R11 and the condenser C5. In the same way speech currents coming from the two-wire line L are partly led away from the line 23–24 through a line 43–44 to a second input transformer T2, the secondary winding of which is connected between base and emitter of a second transistor Tr2 through a condenser C2 and the parallel connection R11–C5. The emitter-collector circuit of the transistor Tr2 is connected between ground and said constant potential (−) in the control current bridge through the parallel connection R11–C5, the primary winding of a second output transformer T4, the point 2 and the parallel connection of the resistance R17 and the condenser C4. The secondary winding of its output transformer T4 has the two terminals connected through unipolar rectifiers L3 and L4 to the common point 5.

The arrangement now described functions in the following way.

When the arrangement rests, that is when no speech currents are fed to the amplifiers F1 and F2, which nevertheless are connected in order to amplify fed currents, the transistors Tr1 and Tr2 conduct equally large direct currents, for instance 1 ma. each. The potential at the points 1 and 2 are then equal, and through the attenuation circuits D1 and D2 equally large control currents are flowing through the attenuation circuits D3 and D4. For the attenuation circuit D1 for instance the control current path will be 1–36–L11–L12–35–32–3–R15–1. The reason why the attenuation circuits D3 and D4 do not obtain any control currents is due to the fact that the points 3 and 4 have the same potential in this case. The conditions now mentioned are quite clear from FIG. 3. Equal potential in the points 1 and 2 gives currents through D1 and D2 by R15 and R16 and as these resistances are equally large, the potentials in the points 3 and 4 will be equal, that is no currents will flow through D3 and D4. This case is represented in FIG. 4 by the ordinate $v1=v2$, where $v1$ indicates the potential of point 1 and $v2$ the potential of point 2. The control currents through the attenuation circuits D1, D2, D3 and D4 are here represented by the designations $i1$, $i2$, $i3$ and $i4$. As appears $i1=i2=i$ while $i3\approx i4\approx 0$.

When the arrangement is adjusted for transmission, that is when speech currents generated by the microphone are delivered to the two-wire line L, some of these speech currents are led away by the line 33–34 and the transformer T1 to the transistor Tr1. Speech currents amplified by the transistor are rectified in the circuit formed by the secondary winding of the transformer T3, the rectifiers L1–L2, the resistance R12 and the condenser C2. The center tap on the secondary winding now obtains a negative potential relative to point 5, and this negative potential is transmitted through the secondary winding of the transformer T2 to the base of the transistor Tr2 while the increased potential of the point 5 is transmitted to the base of the transistor Tr1 via the rectifiers L3–L4, the secondary winding of the transformer T4 and the secondary winding of the transformer T1. The change of the negative potential of the base of the transistor Tr2 causes an increased current through this transistor which results in a drop of potential across the resistance R11 common for the two transistors Tr1 and Tr2. The change of the positive potential on the base of the transistor Tr1 and the change of the negative potential on the emitter of the same transistor cause a decreased current through the transistor Tr1. This results that the point 2 becomes to be of higher potential than the point 1, that is $v2>v1$ and the attenuators D2 and D4 become control current while the attenuator D2 becomes a control current decreasing toward zero. Consequently, the speech currents generated by the microphone can reach the two-wire line L, while speech currents coming from this line cannot reach the loudspeaker H.

When the arrangement is adjusted for receiving, that is when speech currents are coming from the line L, some of these speech currents are diverted via the line 43–44 and the transformer T2 to the transistor Tr2. In analogy with the previous description the direct current through the transistor Tr2 is decreased and the direct current through the transistor Tr1 is increased, the point 1 becomes higher potential than the point 2, that is $v1>v2$, and the attenuation circuits D1 and D3 become control current while the attenuator D2 becomes control current decreasing toward zero. For the attenuation circuit D3 the control current path will be 3–32–L31–L32–31–4. That the attenuation circuit D4 does not contain any control current is a result of the fact that the point 3 in this case has higher potential than point 4. The speech currents coming from the two-wire line L can consequently reach the loudspeaker H, while speech currents possibly generated by the microphone M cannot reach the line L.

From the preceding it appears that an increase of speech current signal (alternating current signal) which is fed to for instance the transformer T1 causes a corresponding decrease of the direct current sinks through the transistor Tr1; that is, a counteraction arises which gives an increased compression, which in its turn means an increased dynamism and a lower distortion. However, this compression has no or very little influence on the modulation of the attenuation circuits and begins to an essential degree not until the attenuation circuits in question have become full control current. This depends thereon that full attenuation in respective attenuation circuits is obtained at a change of the main current through the resistances R14 and R17 with 10%. This relatively small, but necessary current change makes the arrangement rapid at the switching in for transmission or receiving. On the other hand the arrangement should be relatively slow at the switching off, and this is achieved by a co-operation between the condenser C3 (respectively the condenser C4 for the opposite direction) and a series circuit of a resistance R18 and a condenser C5 between the point 1 and the upper terminal of the condenser C1 (respectively a series circuit of a resistance R19 and a condenser C6 between the point 2 and the upper terminal of the condenser C2). In the case that incoming speech currents received by the amplifier arrangement should stop, the potential on the collector of the transistor Tr1 will fall rapidly at first to a level which lies somewhat higher than the level which involves modulation of the attenuation circuits in question; for this the condenser C3 is responsible. Then the potential of the collector will fall slowly to the level, which is equivalent to the rest condition of the arrangement; this is affected by the series circuit R18–C5.

I claim:

1. An amplifier system for use in loudspeaking telephones, said system comprising a first amplifier for amplification of outgoing speech signals from the microphone of the telephone and intended for transmission over a two-wire line; a second amplifier for amplification of speech signals intended for the loudspeaker of the telephone and coming from the two-wire line; a current-controlled first attenuation circuit including a current-control circuit, said attenuation circuit during operation of the system affecting the amplification of said outgoing speech signals and being attenuating during the rest condition of the first amplifier when said amplifier is connected but is not being fed with speech signals; a current-controlled second attenuation circuit including a current-control circuit, said second attenuation circuit during operation of the system affecting the amplification of said incoming speech signals and being attenuating during the rest condition of the second amplifier; a third current-controlled attenuation circuit including a current-control circuit, said third attenuation circuit during operation of the system affecting the amplification of said outgoing speech signals and being only slightly attenuating during the rest condition of said first amplifier; a fourth current-controlled attenuation circuit including a current-control circuit, said fourth attenuation circuit during operation of the system affecting the amplification of said incoming speech signals and being only slightly attenuating during the rest condition of the second amplifier, the current-control circuit of the third attenuation circuit and the current-control circuit of the fourth attenuating circuit being connected in parallel, and the current-control circuit of the first attenuation circuit, the parallel connection of the current-control circuits of said third and fourth attenuation circuits and the current-control circuit of said second attenuation circuit being connected in series; a current-controlled supply circuit having two terminals, said serially connected current-control circuits being connected between said terminals; and two control amplifiers for controlling said supply circuit, one of said control amplifiers being fed with speech input signals derived from before said first attenuation circuit and the other control amplifier being fed with speech input signals derived from before said second attenuation circuit, and the outputs of said control amplifiers being connected one to each of said two terminals, the arrangement being such that during operation the direction of the control currents of said first and third attenuation circuits is the same and is opposite to the direction of the control circuits of the second and fourth attenuation circuits.

2. An amplifier system according to claim 1, wherein said control-current supply circuit includes four resistances and a source of substantially constant potential, said two terminals of the supply circuit being each connected to the same pole of said source through separate, substantially equal resistances, and wherein said supply circuit has two further terminals, each of said further terminals being connected to said pole through separate, substantially equal resistances, one of said further terminals being connected to a junction between the control circuit of said first attenuation circuit and said parallel connection and the other being connected to a junction between the control circuit of said second attenuation circuit and said parallel connection.

3. An amplifier system according to claim 2, wherein said two first-mentioned terminals of the control-current supply circuit are connected to the outputs of said two amplifiers, said system also comprising two transformers each having a primary winding and a secondary winding; each of said connections between one of said terminals and one of said amplifiers including one of said primary windings, the secondary winding of the transformer for one of said amplifiers being center tapped and connected to the input of the other amplifier, the ends of the secondary windings of the transformers being each connected to a common point, and a rectifier included in each of said connections between the respective secondary winding and the common point, the like electrodes of each rectifier being connected to said common point and said common point being connected to said one pole of the source of potential.

References Cited in the file of this patent

UNITED STATES PATENTS

| | | |
|---|---|---|
| 2,332,430 | Berger | Oct. 19, 1943 |
| 2,370,388 | Baird | Feb. 27, 1945 |
| 3,022,379 | Soderbaum et al. | Feb. 20, 1962 |
| 3,046,354 | Clemency | July 24, 1962 |